(12) United States Patent
Schilder

(10) Patent No.: US 10,408,498 B2
(45) Date of Patent: Sep. 10, 2019

(54) SOLAR COLLECTOR

(71) Applicant: Johannes Jacobus Maria Schilder, Volendam (NL)

(72) Inventor: Johannes Jacobus Maria Schilder, Volendam (NL)

(73) Assignee: Johannes Jacobus Maria Schilder, Volendam (NL)

( * ) Notice: Subject to any disclaimer, the term of this patent is extended or adjusted under 35 U.S.C. 154(b) by 162 days.

(21) Appl. No.: 15/534,430

(22) PCT Filed: Dec. 19, 2014

(86) PCT No.: PCT/IB2014/067159
§ 371 (c)(1),
(2) Date: Jun. 8, 2017

(87) PCT Pub. No.: WO2015/097629
PCT Pub. Date: Jul. 2, 2015

(65) Prior Publication Data
US 2017/0343242 A1 Nov. 30, 2017

(51) Int. Cl.
*F24J 2/06* (2006.01)
*F24S 23/00* (2018.01)
(Continued)

(52) U.S. Cl.
CPC ............ *F24S 23/12* (2018.05); *F24S 23/30* (2018.05); *F24S 30/452* (2018.05); *F24S 60/00* (2018.05);
(Continued)

(58) Field of Classification Search
CPC ............ F24S 23/30; F24S 60/00; F24S 80/60
(Continued)

(56) References Cited

U.S. PATENT DOCUMENTS 4,018,212 A * 4/1977 Hein ............... F24S 50/00
126/681
4,078,545 A * 3/1978 Justi ............... F24S 80/60
126/661
(Continued)

FOREIGN PATENT DOCUMENTS

CN 103231869 A 8/2013 ............ B65D 81/38
DE 3139104 A1 3/1983 ............ F16L 59/00
(Continued)

OTHER PUBLICATIONS

Technical data sheet "WDS Lambdaflex Super" from Porextherm Feb. 15, 2010, retrieved from Internet: http://www.porextherm.com/images/anhaenge/db_lamsu_de.pdf.
(Continued)

*Primary Examiner* — Avinash A Savani
(74) *Attorney, Agent, or Firm* — Harness, Dickey & Pierce, P.L.C.

(57) ABSTRACT

A solar collector 1 for the temporary storage of heat from solar radiation comprising a radiation conductor 8, 9 for conducting the solar radiation, and lens means 7 for concentrating solar radiation onto a first extremity of the radiation conductor. A thermally-insulated core 2 is provided on an opposite second extremity of the radiation conductor 8, 9 in order to be heated by the solar radiation released from the radiation conductor and temporarily storing the heat. For this purpose, the core is provided with an insulated casing 4, virtually completely enveloping the core, which insulated casing 4 comprises a layer of porous ceramic material.

12 Claims, 3 Drawing Sheets

(51) Int. Cl.
*F24S 80/65* (2018.01)
*F24S 80/60* (2018.01)
*F24S 30/452* (2018.01)
*F24S 60/00* (2018.01)
*F24S 23/30* (2018.01)
*F24S 50/20* (2018.01)

(52) U.S. Cl.
CPC .............. *F24S 80/60* (2018.05); *F24S 80/65* (2018.05); *F24S 50/20* (2018.05); *Y02E 10/47* (2013.01)

(58) Field of Classification Search
USPC ........................................................ 126/617
See application file for complete search history.

(56) References Cited

U.S. PATENT DOCUMENTS

| | | | |
|---|---|---|---|
| 5,191,875 A | 3/1993 | Edling et al. | 126/576 |
| 6,099,931 A | 8/2000 | Heller et al. | 428/68 |
| 2007/0221208 A1 | 9/2007 | Goldman | 126/651 |
| 2013/0291541 A1 | 11/2013 | Hischier et al. | 60/641.14 |

FOREIGN PATENT DOCUMENTS

| | | | |
|---|---|---|---|
| DE | 10335425 B3 | 8/2004 | ............. C09K 5/08 |
| DE | 102012000209 A1 | 7/2013 | ............. F24J 2/46 |
| EP | 0094598 A1 | 11/1983 | ............. F21S 11/00 |
| EP | 0987510 A2 | 3/2000 | ............. F28F 27/00 |
| EP | 2278249 A1 | 1/2011 | ............. F28D 20/00 |
| EP | 2302308 A1 | 3/2011 | ............. F24J 2/51 |
| JP | H07-27425 | 1/1995 | ............. F24J 2/14 |
| JP | 2013-119969 | 6/2013 | ............. F24J 2/46 |
| WO | 2009-002168 A1 | 12/2008 | ............. F24J 2/08 |
| WO | 2009-028915 A2 | 3/2009 | ............. F24J 2/12 |

OTHER PUBLICATIONS

International Search Report (ISR) and Written Opinion (WO) dated Apr. 7, 2015 in PCT/IB2014/067159, published as WO 2016/0016385.

Porextherm, WDS Lambdaflex Super, Version 1.01/ Dec. 1, 2004 / HH, accessed online May 29, 2018, http://www.lloyd-ris.co.uk/pdfs/datasheets/MICROPOROUS%20Insulation%20Board.pdf <https://protect-us.mimecast.com/s/4GefCPNM7gfVKLvi6OUtN>.

Office Action from corresponding Moroccan Patent Application No. 40654, dated Dec. 14, 2017.

* cited by examiner

SOLAR COLLECTOR

CROSS-REFERENCE TO RELATED APPLICATIONS

This application is a national phase application of PCT Application No. PCT/IB2014/067159, filed on 19 Dec. 2014. The entire disclosure of the application identified in this paragraph is incorporated herein by reference.

The present invention relates to a solar collector for the temporary storage of heat from solar radiation at any time comprising a radiation conductor for conducting solar radiation, lens means for concentrating the solar radiation onto a first extremity of the radiation conductor, and comprising a thermally insulated core to an opposite second extremity of the radiation conductor the core of which is heated by the solar radiation emitted from the radiation conductor and is capable of storing the heat temporarily.

Such a solar collector is known from the international patent application WO 2009/002168 of the applicant. This known solar collector comprises a thermally-conducting core which can heat up from solar radiation and is capable of retaining this heat over a certain period. Unlike conventional solar collectors which heat a liquid by means of lens means to make use of it directly, this known solar collector makes it possible to generate usable energy even during periods in which the quantity of solar radiation received is relatively low, such as during the night. The thermally conducted core can, in fact, store a relatively large quantity of heat and is thus used as an energy buffer during such periods of low solar radiation.

Although the known solar collector can already be used effectively to generate energy continuously for longer periods, it is apparent that improvements can be made, in other words on the return, particularly by counteracting heat loss.

The purpose of the present invention is thus to create a further improved solar collector of the type mentioned above.

In order to achieve the intended aim, a solar collector of the type mentioned in the preamble in accordance with the present invention is characterised in that the core is provided with an insulated casing virtually entirely enveloping the core, which insulated casing comprises a layer of porous ceramic material. The invention is based on the understanding that, in spite of the inherent insulation problem, a core with as high as possible a thermal capacity leads to the best results. Due to the high temperatures which can be achieved with a core with a high thermal capacity, it is highly significant that the insulation used is resistant to such temperatures. A layer of porous ceramic material is particularly well-suited as insulation to provide no or hardly any heat loss even at the highest temperatures. To counteract a leakage of heat as much as possible, the layer is provided in an insulated casing that virtually completely envelops the core anyway. Although such an insulated casing with ceramic material is not particularly lightweight, it is apparent that in particular with regard to the scale of relatively large solar collectors it is less inconvenient than expected. The energy loss by controlling the solar collector with increased weight does not affect the return by such a good insulation of a core with high thermal capacity.

Given that every gap or weak point in the insulation layer increases the risk of a heat leakage, the solar collector in accordance with the invention in a preferential embodiment is characterised by the layer of ceramic material being virtually seamless. In this way, the layer of ceramic material can be moulded around the core in accordance with a further preferential embodiment of the solar collector in accordance with the present invention. Such moulding of the layer of ceramic material leads to a virtually uninterrupted integral body without seams, that has a virtually uniform insulation value over the entire surface. This prevents weak spots in the insulation as far as possible.

To capture thermal radiation well, the layer of ceramic material is porous. For example, this can be done by taking a porous material or, for example, by adding a supplementary substance to the ceramic material that is burnt away from the layer when heating to leave behind a desired network of pores in the layer.

In a further preferential embodiment, the solar collector in accordance with the invention is characterised in that the layer of ceramic material comprises a light flame-resistant masonry product. Such a masonry product, such as refractory materials, is to be applied simply in a desired form in a layer around the core, is resistant to very high temperatures and has outstanding insulation values.

In a particular embodiment, the solar collector in accordance with the invention is characterised in that around one of the side of the insulated casing away from the core is provided with at least one reflector body with a radiation-reflecting side pointing towards the core. The reflector body shall only reflect the infrared radiation escaping through the insulated casing back to the core, which results in a further improvement of the insulation value of the whole.

A further preferred embodiment of the solar collector in accordance with the invention is characterised in that the core and insulated casing are accommodated in a virtually air-tight closed housing and that means are provided for creating a virtual vacuum within the housing around the core and insulated casing. By creating a vacuum in the solar collector in all the spaces between the parts, a possible release of heat by conduction or convection heat transfer is limited as much as possible. In so doing, the thermal loss is virtually exclusively possible via radiation, which, however, due to the measures described above in accordance with the invention, is counteracted as much as possible.

In a further preferred embodiment, the solar collector in accordance with the present invention is characterised in that the core comprises a heat-resistant, conductive material with a relatively high thermal capacity. A further particular embodiment of the solar collector in accordance with the present invention has the characteristic that the core comprises a solid block of steel. Steel has a suitable thermal capacity for use in the solar collector, and has a high melting point so that it can be used as a solid block in spite of the high temperature accumulating in the core. By using such a steel core, it is possible to heat the core to a temperature of 1500 degrees Celsius. The solar collector in accordance with the present invention thus has a further particular embodiment, however, as a characteristic that the core stores a temperature up to a maximum of 1200 degrees Celsius. Such a temperature of the core provides a sufficiently long energy buffer to bridge periods of less or no solar radiation, while all the components of the solar collector such as the radiation conductor appear to be resistant to this temperature.

A further particular embodiment of the solar collector in accordance with the present invention has the characteristic that the core comprises a liquid mass of aluminium. Aluminium has an excellent thermal capacity, is relatively lightweight and is also very conductive, so that the heat can be extracted from it very quickly to generate energy from it. Due to the relatively low melting point of aluminium, a liquid mass of aluminium is necessary to achieve efficient temperatures in the core.

In a further preferential embodiment, the solar collector in accordance with the present invention is characterised in that the light conductor partly comprises quartz fibre. Such a quartz fibre is particularly suitable for conducting solar radiation over the length of the fibre without any significant loss of light. In particular, the quartz fibre is good at withstanding high temperatures achieved in the core of the solar collector, up to 1200 degrees Celsius. In this way, the quartz fibre is suitable for use close to the core of the solar collector.

Although it is possible to manufacture the radiation conductor completely from quartz fibre, the use of glass fibre also provides advantages. Glass fibre is clearly less expensive compared with quartz fibre and, furthermore, is much more flexible. As a result, glass fibre is better suited for use in a radiation conductor with bends and curves. However, at higher temperatures, such as those which may occur in the core of the solar collector, the glass fibre is affected so that the radiation conduction is no longer optimum as a result. For this reason, a further particular embodiment of the solar collector in accordance with the present invention is characterised in that the quartz fibre comprises the second extremity of the radiation conductor and extends to outside the insulated casing, and that a glass fibre is bonded with the quartz fibre and comprises the first extremity of the radiation conductor. Only that part of the radiation conductor that must withstand the highest temperatures, in particular the part between the core and the insulated casing, is manufactured from heat-resistant quartz fibre, while the other part of the radiation conductor from the insulated casing until close to a focus of the lens means is made of more flexible glass fibre.

A further preferential embodiment of the solar collector in accordance with the invention is characterised in that the radiation conductor is fastened with the second extremity to an outer side of the core at the location of a recess in the core and under the inclusion of a space in the recess to allow solar radiation emitting from the radiation conductor being converted into energy to come into contact with the surface of the core. The recess in the core creates a larger core area within the recess, by which the solar radiation being emitted from the radiation conductor is incident to remove the radiation energy in the form of heat to the core. In a further preferred embodiment, the solar collector in accordance with the present invention is characterised in that an anti-reflection coating against the core is applied into the recess. The anti-reflection coating absorbs the solar radiation emitted from the radiation conductor and emits this as heat to the core. In this way, the solar radiation being able to be reflected back into the radiation conductor, which would mean a loss of energy, is counteracted.

The invention will now be explained in more detail using an illustrative example and associated drawing. In the drawing.

Incidentally, the figures are purely schematic and not drawn to scale. In fact, some of the dimensions are shown exaggerated for the sake of clarity.

Corresponding parts are indicated with the same reference number in the figures where at all possible.

Figure 1:
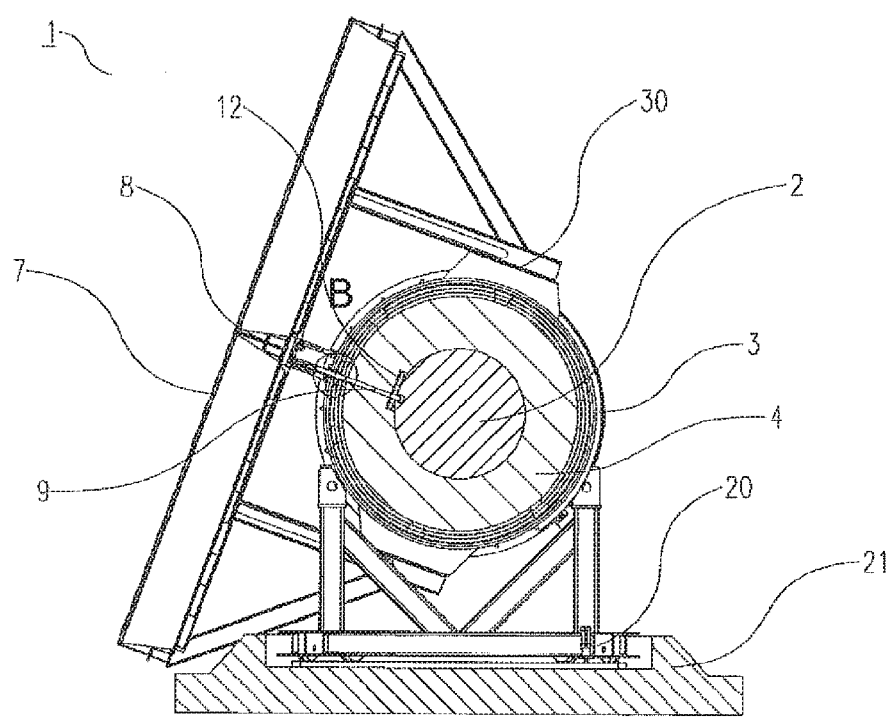
FIG. 1 shows an illustrative example of a solar collector in accordance with the invention in a side elevation of a cross section.
Figure 2:
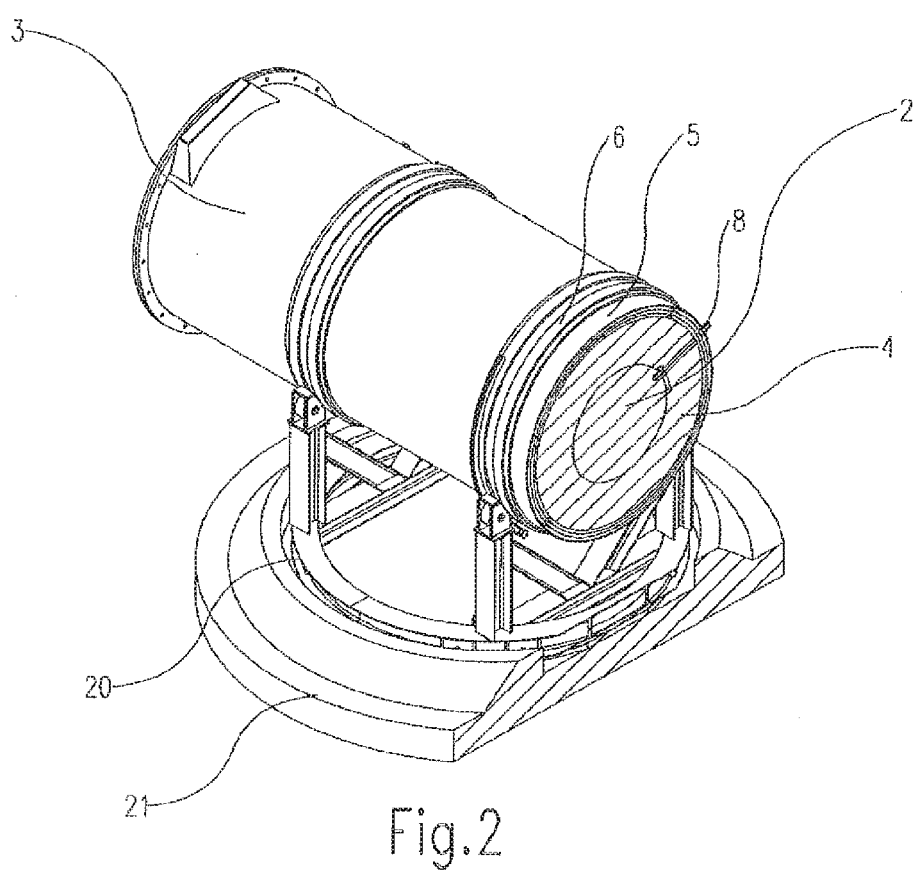
FIG. 2 shows a perspective view of the core in a housing of the illustrative example of a solar collector in accordance with the invention as shown in FIG. 1.

The solar collector 1 shown in FIG. 1 for the temporary storage of heat from solar radiation comprises a thermally-conducting core 2 within a cylindrical metal housing 3, as better shown in FIG. 2. The core 2 in this illustrative example is a solid block of steel that, in accordance with the present invention, can be heated to 1200 degrees Celsius. To retain this heat for longer periods, around the core 2 an insulated casing 4 is provided completely enveloping the core. The insulated casing 4 comprises a layer of ceramic material with a high insulation value. At a distance from the insulated casing 4 is provided a first reflector body 5 which has one side reflecting radiation towards the core, to reflect back radiation escaping from the insulated casing back towards the core. At a distance from the first reflector body 5 is provided a second reflector body 6 for a further reflection of radiation back to the core. The housing furthermore comprises means (not shown) of being able to create a vacuum within the housing, so that in spaces between the reflector bodies 5, 6 and the insulated casing 4 a virtually complete vacuum prevails. This virtually excludes a heat loss by convention or conduction.

The outer side of the housing remains at a temperature when using the solar collector which virtually corresponds to that of an ambient temperature at a temperature of the core of 1200 degrees Celsius. So there is a negligent quantity of heat loss to the outside environment. The solar collector in accordance with the present invention, thus provides a particularly thorough return, and is capable not only of providing energy during hours of sunshine, but also of creating an energy buffer from which, during periods of less solar radiation, continuous energy can be extracted.

For heating of the core 2, in front of the housing 3 a screen 7 is placed in which lens means are provided to concentrate solar radiation. The lens means comprise a system of lenses placed at an equal distance apart and directed towards the sun, where in each case the solar radiation incident on the lens concentrates on its own focus. However, at the focus, behind each lens a first extremity of a radiation conductor in the form of a glass fibre is placed, so that the concentrated solar radiation is collected in the fibre. Through the glass fibres of each lens, the solar radiation is conducted towards the housing 3. For a maximum collection of solar radiation, tracking means are provided to be able to follow the passage of the sun over the day. For this purpose, the housing 3 is situated on a rotating first frame 20 that can be turned completely within a horizontal base 21 on which the solar collector is supported, while the screen with lenses is fastened to a rotating second frame 30 that rotates over a distance around the housing 3. A continuous adjustment of the lenses from one position to the next is realised by automatic driving of the rotating frames in response to a signal of the tracking means. It will be apparent to a person skilled in the art that the tracking means, for example, may comprise a sensor which continuously records the position of the sun and passes on to processing means such as a processor, for example, which processing means then sends an output signal to duly provided driving means which achieve a necessary adjustment of one of either frames 20, 30.

Figure 3:
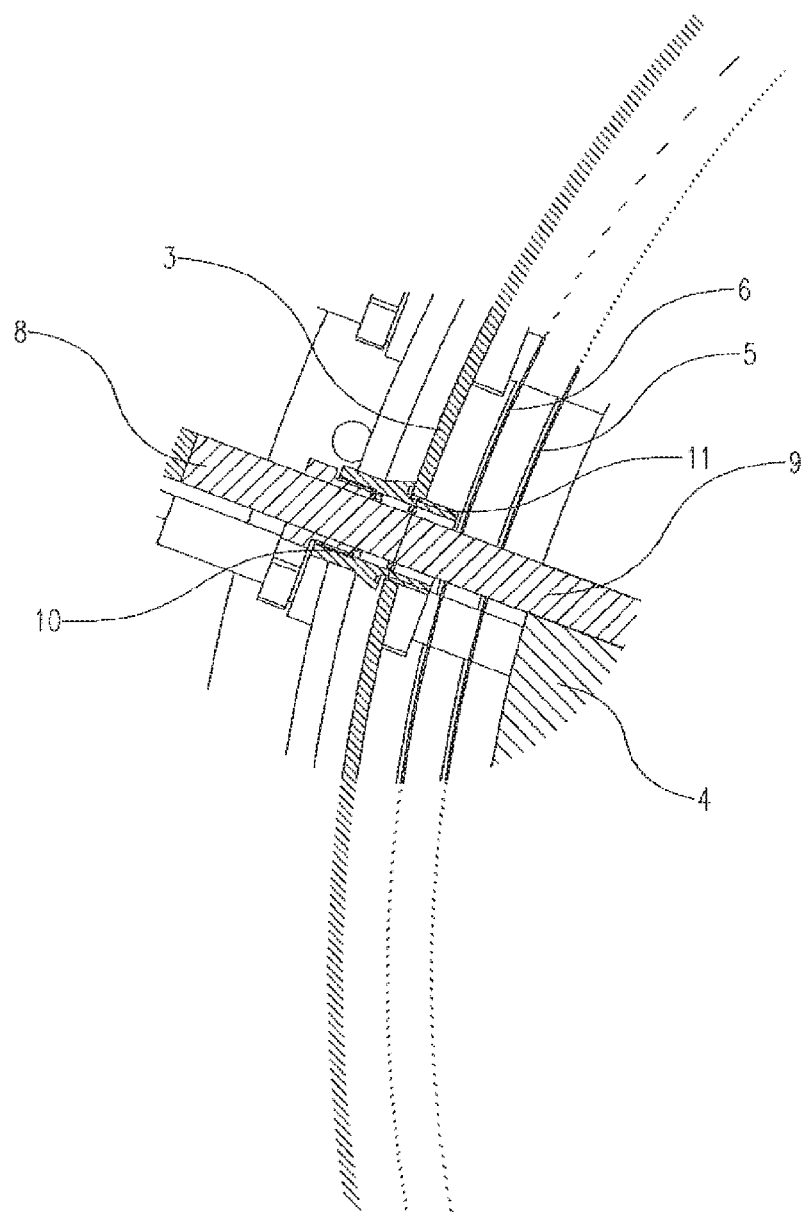
FIG. 3 shows a cross-section detailed view of the core in a housing in accordance with the region B as shown in FIG. 1.

As shown in FIG. 3 in more detail, an extremity of the glass fibre 8 is fastened by means of fastening means 10 to an outer side of the housing 3. The extremity of the glass fibre is thus received fitting onto an extremity of a quartz fibre 9, so that the solar radiation from the glass fibre transfers into the quartz fibre without loss of radiation. The quartz fibre 9 is fastened by means of further fastening means 11 to the inner side of the housing 3. Flexible adjustable means in the form of O-rings are provided in the leadthrough of the housing through which the radiation conductor extends to seal off the entirety. The quartz fibre 9 is guided from the inner side of the housing 3 to virtually up to the core 2 where the quartz fibre 9 forms the second extremity of the radiation conductor. The second extremity of the radiation conductor is fastened by means of fixing means 12 against the core 2 at the place of a recess in the core 2. Radiation particles released from the radiation conductor thus come into the space in the recess, so that the radiation can be incident at a greater core area and loss by reflection of radiation back to the radiation conductor is minimised.

Although the invention is further explained by means of merely a single illustrative example, it may be clear that the invention is no way restricted to it. On the contrary, many more variations and embodiments are possible to an average person skilled in the art within the framework of the invention.

The invention claimed is:

1. A solar collector for the temporary storage of heat from solar radiation comprising:
   a radiation conductor for conducting solar radiation,
   lens for concentrating solar radiation onto a first extremity of the radiation conductor, and
   a thermally insulated core on an opposite second extremity of the radiation conductor
   wherein the core is heated by the solar radiation emitted from the radiation conductor and is in a position to store the heat temporarily,
   wherein the core is provided within an insulated casing virtually completely enveloping the core, and
   wherein the insulated casing comprises a layer of porous ceramic material,
   wherein the radiation conductor comprises partly a quartz fiber, and
   wherein the quartz fiber comprises the second extremity of the radiation conductor and extends to outside the insulated casing and that a glass fiber is connected to the quartz fiber and comprises the first extremity of the radiation conductor.

2. The solar collector in accordance with claim 1, wherein the layer of ceramic material comprises a light fire-resistant layer of masonry.

3. The solar collector in accordance with claim 1, wherein the layer of ceramic material is virtually seamless.

4. The solar collector in accordance with claim 1, wherein around the insulated casing on the side away from the core, at least one reflector body is provided with a reflective side pointing towards the core.

5. The solar collector in accordance with claim 1, wherein the core and the insulated casing are accommodated in a housing enclosed virtually air-tight and that means are provided for virtually creating a vacuum within the housing around the core and the insulated casing.

6. The solar collector in accordance with claim 1, wherein the core comprises a heat-resistant, conductive material.

7. The solar collector in accordance with claim 6, wherein the core comprises a solid block of steel.

8. The solar collector in accordance with claim 6, wherein the core comprises a liquid mass of aluminum.

9. The solar collector in accordance with claim 1, wherein the core stores a temperature up to maximum 1200° C.

10. The solar collector in accordance with claim 1, wherein the radiation conductor is fastened with the second extremity to an outside side of the core at the location of a recess in the core and under the inclusion of a space in the recess to allow the solar radiation from the radiation conductor changing into energy to come into contact with a surface of the core.

11. The solar collector in accordance with claim 3, wherein the layer of ceramic material is molded around the core.

12. The solar collector in accordance with claim 6, wherein the core comprises a metal.

* * * * *